United States Patent [19]

Flotow

[11] Patent Number: 4,660,702
[45] Date of Patent: Apr. 28, 1987

[54] CLUTCH RELEASE BEARING

[75] Inventor: Richard A. Flotow, Butler, Ind.

[73] Assignee: Dana Corporation, Toledo, Ohio

[21] Appl. No.: 726,573

[22] Filed: Apr. 24, 1985

[51] Int. Cl.⁴ .................. F16D 25/08; F16D 13/58
[52] U.S. Cl. ............................ 192/98; 192/30 W;
    192/91 A; 192/85 CA; 192/109 R; 92/165 PR
[58] Field of Search ................ 192/98, 30 W, 91 A,
    192/107 M, 85 CA, 109 R; 92/5 R, 13.4, 165
    PR; 188/1.11; 384/300

[56] References Cited

U.S. PATENT DOCUMENTS

| Re. 23,326 | 1/1951 | Fleischel | 192/0.07 |
|---|---|---|---|
| 2,501,005 | 3/1950 | Rockwell | 192/91 A |
| 2,564,281 | 8/1951 | Rockwell | 192/91 A |
| 2,668,610 | 2/1954 | Backus | 192/91 A |
| 2,717,680 | 9/1955 | Smith | 192/91 A |
| 2,757,769 | 8/1956 | Roise | 192/91 A |
| 2,864,480 | 12/1958 | Sink | 192/91 A |
| 2,873,834 | 2/1959 | Kepner | 192/91 A |
| 2,885,049 | 5/1959 | Staadt | 192/91 A |
| 3,314,513 | 4/1967 | Lake et al. | 192/91 A |
| 3,907,085 | 9/1975 | Rist | 192/91 A |
| 3,955,660 | 5/1976 | Poon et al. | 192/91 A |
| 4,366,890 | 1/1983 | Suckow | 192/91 A X |
| 4,529,076 | 7/1985 | Renaud | 192/98 |
| 4,561,531 | 12/1985 | Young et al. | 192/109 R X |

FOREIGN PATENT DOCUMENTS

| 1046410 | 12/1958 | Fed. Rep. of Germany | 192/30 W |
|---|---|---|---|
| 2503896 | 8/1976 | Fed. Rep. of Germany | 192/98 |
| 2659578 | 7/1977 | Fed. Rep. of Germany | 192/98 |
| 2088510 | 6/1982 | United Kingdom | 192/30 W |

Primary Examiner—Rodney H. Bonck
Assistant Examiner—David A. Testardi
Attorney, Agent, or Firm—Frank B. McDonald

[57] ABSTRACT

A friction clutch system includes a constant running release bearing member designed to accommodate axial misalignment. In a preferred form, a wave washer is interposed between a flange of a bearing carrier and the outer race of the release bearing member to provide for axial flexibility. In addition, a mechanical stop is provided to limit axial travel of a thrust ring affixed to the axially moveable bearing member in a direction of clutch disengagement. In a preferred form the stop is formed of an elongated shaft having a radially extending projection for arresting the carrier movement beyond a predetermined limit. A sleeve positioned over the shaft includes markings to permit visual indication of amount of clutch wear to aid in the servicing of the clutch system. Also in a preferred form, the carrier is formed of two resilient non-metallic parts and incorporates a snap fit flange-detent connection system which preloads the wave washer upon assembly of the two carrier parts.

8 Claims, 4 Drawing Figures

CLUTCH RELEASE BEARING

BACKGROUND OF THE INVENTION

This invention relates to constant running release bearing assemblies, and more particularly to flexibility of movement of constant running release bearing members for accommodating axial misalignments.

Prior art release bearings have been designed with very little flexibility, and hence have lacked adequate compensation for axial misalignments encountered in the operation of friction clutches. Many prior art systems simply rely on tolerances within the release bearings per se for misalignment compensation. Such reliance is misplaced, however, to the extent that it often gives rise to shorter release bearing life, particularly where heavy duty clutch plates are involved.

In addition, prior art clutch assemblies include no protection against overstroking or movement beyond desirable limits resulting in damage to the clutch release levers. Typically the levers become bent and do not properly engage the release bearing.

Moreover, prior art assemblies have not included adequate wear limit indicators, which can avoid potentially large expense. For example, where rivets are utilized to secure the clutch linings, excessive wear of clutch linings will result in grooving of pressure plates and/or flywheels. In subsequent repairs, the clutch must be disassembled, and the plates must be machined to remove the grooving damage caused by exposed rivets during operation of the clutch beyond the useful life of clutch linings.

An improvement is therefore needed which will address the problems of (1) axial misalignment, a particular problem where heavy duty clutch plates are involved, and (2) axial limits of movement of release bearings both to prevent overstroking, and as related to the use of a clutch beyond the useful life of clutch linings.

SUMMARY OF THE INVENTION

The invention disclosed herein provides an angular flexibility of movement for a clutch release bearing member to accommodate axial misalignment, and at the same time provides an absolute axial limit of travel of the bearing in the direction of clutch release.

In a preferred form, an axially moveable release bearing assembly is incorporated in a friction clutch system. The assembly includes a hydraulically actuated release bearing member of the constant running type which is secured to one end of a bearing carrier supported on a fixed tubular support and defines an axis coincident with that of the tubular support. The carrier is axially but non-rotatably moveable on the support, and includes a flange which radially supports the release bearing member. A wave washer is radially interposed between the flange and the outer race of the bearing member to accommodate axial misalignment. In addition, the carrier is restrained from axially moving beyond a certain limit by a stop mechanism secured to a fixed structure, as for example a transmission wall.

In a preferred form, the stop mechanism consists of a shaft threadably secured at one end, with a radially extending arresting projection at its opposite end to prevent overstroking of the clutch release bearing assembly. A resilient sleeve is slidably positioned over an unthreaded portion of the shaft. The sleeve contains markings for visual indication of amount of clutch wear at any given time. The sleeve includes a ring which at a predetermined position makes abutting contact with the projection on the shaft to arrest movement of the resilient sleeve at a desired limit.

Also in a preferred form, the carrier is made of a non-metallic composition, such as polytetraflouroethylene or other resilient material. The carrier is made of two parts, one part having a radially extending flange and the other defining an annular bearing housing and including a detent ring for mating with the flange to house the bearing member and to preload the wave washer by the snapping of the parts together at the time of assembly. In an alternate embodiment a crimped steel ring is used in lieu of the resilient, non-metallic annular housing.

DETAILED DESCRIPTION OF PREFERRED EMBODIMENTS

Figure 1:
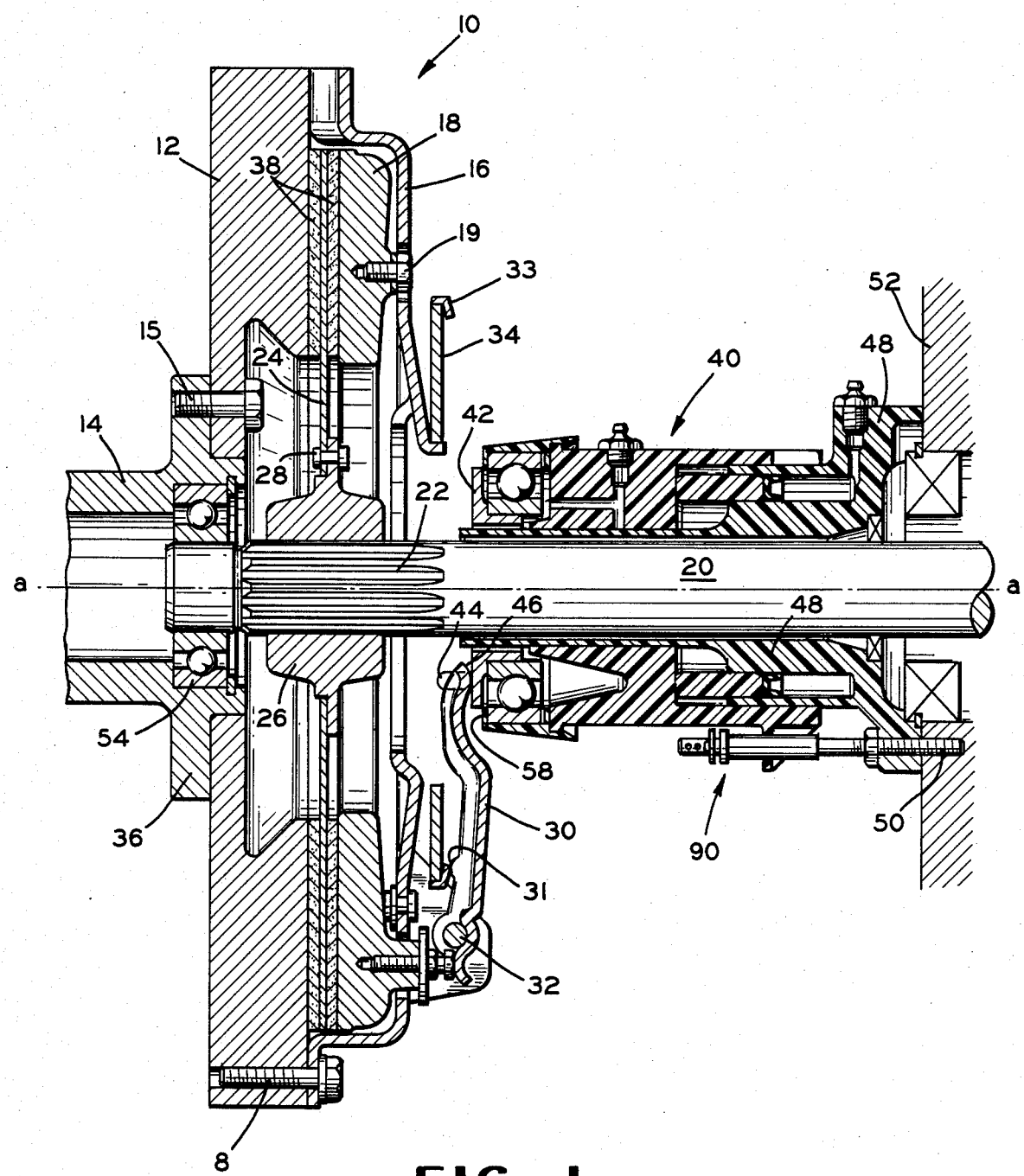
FIG. 1 is a side elevation in cross section of a friction clutch system which incorporates a preferred embodiment of a constant running release bearing assembly constructed in accordance with the present invention.

FIG. 1 presents a cross sectional view of a friction clutch system 10. An engine flywheel 12 is secured to a crankshaft 14 by fasteners 15 to permit direct rotation of the flywheel 12 with the crankshaft 14. The crankshaft 14 is driven by a prime mover (not shown), which may be a typical gasoline or diesel engine. Fastened to the flywheel 12 by circumferentially arranged bolts 8 is a clutch cover 16 which also rotates directly with the engine crankshaft 14. A pressure plate 18, interposed between the flywheel 12 and cover 16, is secured to the cover 16 by a conventional bolt-strap system 19 which permits axial but non-rotatable movement of the pressure plate with respect to the cover.

Sandwiched between the flywheel 12 and the pressure plate 18 for relative rotation with respect to both of the latter is a friction disc 24 secured by rivets 28 to a splined hub 26. The hub is in turn supported on a splined portion 22 of a driven input shaft 20. The disc 24 contains friction linings 38 on opposed sides thereof, whereby the clutch system of the present invention may be utilized for driveably coupling the input shaft 20 with the engine flywheel 12.

A system of levers 30 are pivotally secured to the cover 16 by pivot pins 32. A biasing spring 34 operates to maintain the clutch in a normally engaged position. The levers work against the biasing spring 34 to permit axial movement of the pressure plate 18 away from the disc 24 to effect clutch release. For this purpose each lever includes an intermediate fulcrum boss 31 which engages a biasing spring bracket 33. The levers are thus utilized to secure clamping and release of the friction disc 24 in order to achieve clutching and declutching of the input shaft 20. Whenever the pressure plate 18 is released (by rightward movement thereof as viewed in FIG. 1), the friction disc 24 is permitted to move rightwardly by virtue of the axial sliding of hub 26 on the splined portion 22 of the input shaft 20. In the latter case, inner nose portions 46 of the levers are urged leftwardly to effect disengagement.

A release bearing assembly 40 includes a thrust ring 42 and a driver boss 44, both of which make contact with the inner nose portions 46 of the clutch levers 30. The thrust ring bears axially against the portions 46, while the boss 44 extends from the ring for interdigital communication with the portions 46. As previously noted, pivotal movement of the levers 30 about the pivot pins 32 against the biasing spring 34 effects declutching of the friction clutch system 10. The release bearing assembly 40 includes a fixed tubular support member 48 which is secured by a plurality of fasteners 50 to a fixed support medium such as a transmission housing wall 52. The support member 48 overlies the input shaft 20, but does not rotate with or contact the shaft. The rightward end of the shaft, shown fragmentarily, extends into the transmission gearing system (not shown), while its leftward end is supported in a pocket bearing 54, supported concentrically within an engine crankshaft flywheel coupling flange 36. Hence the input shaft 20 is concentrically aligned with and disposed for axial rotation with the engine crankshaft 14.

Figure 2:
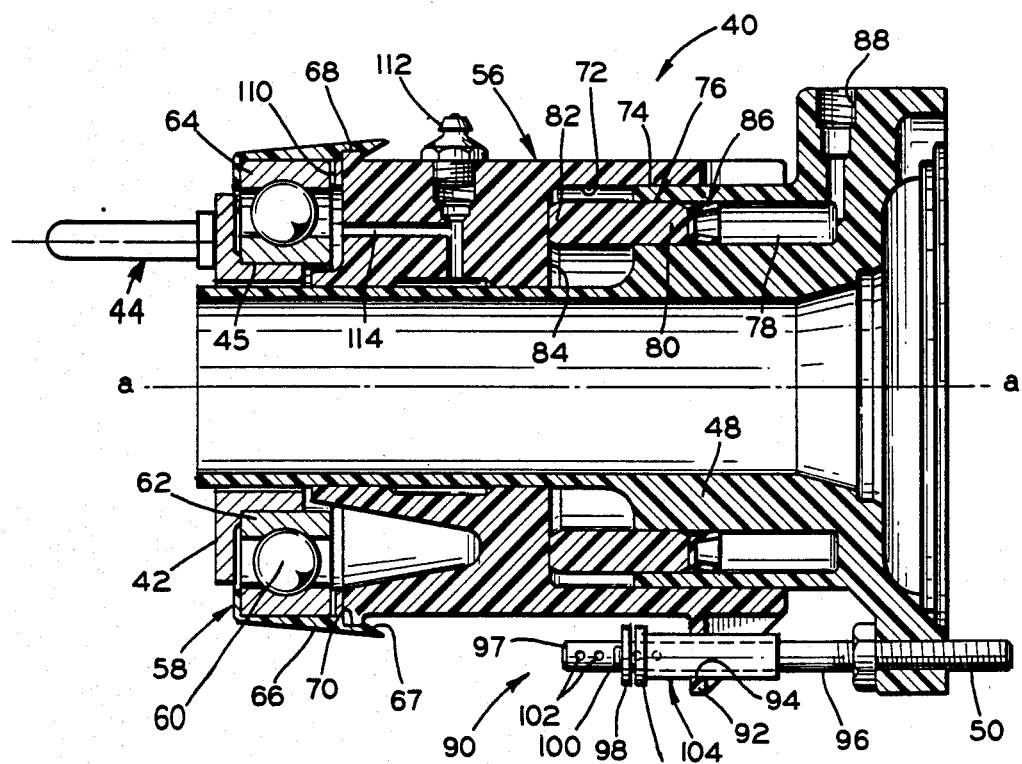
FIG. 2 is an enlarged sectional view of the release bearing assembly shown in FIG. 1.

Referring now to FIG. 2, the release bearing assembly 40 is shown in greater detail. As noted, the bearing assembly includes the tubular support member 48. Concentrically positioned about the support member 48 for axial but non-rotatable movement thereon is a bearing carrier 56 which contains a constant running bearing member 58 secured to the left end of the carrier as viewed in FIGS. 1 and 2. The bearing member 58 includes a plurality of bearing balls 60, an inner race 62, and an outer race 64. The previously mentioned thrust ring 42 is press-fitted into the internal circumference 45 of the bearing inner race 62, and hence is disposed for constant rotation with the clutch release levers 30. Besides the balls 60, inner race 62, and thrust ring 42, no other part of the release bearing assembly 40 rotates. Thus the bearing outer race 64 is non-rotatably supported within an annular bearing housing 66, which in the embodiment of FIG. 2 is polytetrafluoroethylene or other resilient material. The housing 66 is in turn supported rigidly to the bearing carrier 56 by means of an annular release bearing flange 68 which is integral to the carrier 56.

The bearing housing 66 includes an annular detent 70 mateable with the flange 68 for securement of the housing 66 thereto. One principal feature of the present invention relates to the novel use of a wave washer 110, which is positioned between the flange 68 and bearing outer race 64 for imparting axial flexibility as to the bearing member 58 as further described hereinbelow. For proper effectiveness, the washer 110 should be under a constant compression load; hence, a preloading of the washer should be effectively built into the bearing assembly at the time of manufacture. As the housing 66 is made of a resilient material, a bevelled internal edge 67 on the housing will ride up over the flange 68 to provide a snap fit flange-detent connection system. An inherent benefit of the latter connection system is that by means of sizing and tolerance control with respect to the carrier parts, preloading of the washer may be achieved upon the mere assembly of the parts during manufacture.

In the preferred embodiment as shown, operation of the release bearing assembly 40 is hydraulic. Thus, the bearing carrier 56 includes a cylindrical portion 72 slidably supported over an external cylindrical mating surface 74 of the support member 48. An annular piston 76 extends from an annular hydraulic passageway 78 in the support member 48. The piston 76 has a first end 80 which remains at all times within the passageway 78, while including an opposing end 82 which contacts an internal wall 84 of the carrier 56. This action causes the thrust ring 42 to be urged axially against the clutch lever inner nose portions 46. A hydraulic seal 86 retains hydraulic fluid within the passageway 78 during actuation of the piston 76 for clutch release. Hydraulic fluid enters into the passageway 78 by means of an inlet 88 disposed for communication with a hydraulic hose line (not shown).

Those skilled in the art will appreciate that when pressurized hydraulic fluid is introduced into the hydraulic fluid inlet 88, the piston 78 will move leftwardly to cause the thrust ring 42 to contact the inner nose portions 46 of the levers 30, thereby disengaging the friction clutch system 10. Conversely, the release of hydraulic pressure will permit the biasing spring 34 to cause the clutch to become re-engaged, wherein the release lever inner nose portions 46 will move rightwardly (FIG. 1) bearing against the thrust ring 42, and forcing the carrier 56 rightwardly. The end wall 84 of the carrier 56 in turn will bear against the piston 76 to expel hydraulic fluid from the passageway 78, out of the inlet 88, and ultimately back to a hydraulic fluid reservoir.

Those skilled in the art will also appreciate the fact that as the clutch linings 38 (FIG. 1) become worn through use, the leftward displacement of the inner nose portions 46 will decrease with time, wherein the extreme leftward position of the carrier 56 will theoretically move rightwardly with each cycle of clutch engagement/disengagement. The present invention provides an axial travel limit for the carrier and bearing member in the direction of clutch disengagement to prevent overstroking of the clutch. As those skilled in the art will appreciate, this potential problem may result in an actual bending of the release levers due to overstressing.

For preventing this problem, a stop system 90, shown generally at FIG. 1 and more specifically at FIG. 2, comprises a flange 92 fixed to the carrier 56. One of a plurality of threaded fasteners 50 utilized to secure the support member 48 to the transmission housing wall 52 (FIG. 1) comprises an elongated shaft portion 96 which extends through an opening 94 in the flange 92. Secured at an unthreaded free end 97 opposite the secured end of the elongated shaft portion 96 is a washer 98 which is constrained against axial movement leftwardly on the shaft by means of a cotter pin 100 by way of example in the embodiment shown. The cotter pin may be positioned at increments along the unthreaded free end 97 via a plurality of axially spaced apertures 102 extending diametrically through the shaft. The carrier 56 is arrested from leftward movement beyond the limit at which the flange 92 urges against the washer 98 and associated cotter pin 100 which are positioned on the free end 97 of the elongated shaft portion 96.

Figure 3:
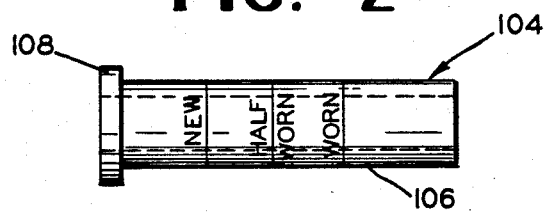
FIG. 3 is a preferred embodiment of a visual wear indicator sleeve incorporated in the embodiments of FIGS. 1 and 2.

In addition to the axial travel limit afforded by the stop system 90, the system 90 also includes a visual wear indicator 104. The wear indicator is shown more graphically in FIG. 3. The indicator comprises a tubular body 106, preferably of a resilient material and having a diameter relative to that of the unthreaded free end 97 which permits it to slide along the shaft portion 96 under a slight amount of frictional resistance. In a preferred form, the indicator 104 is made of a resilient material, and includes an integral head 108 disposed for contacting the flange 92 which forces the head 108 into initial position upon the first disengagement of the clutch after assembly or reassembly. As apparent in FIG. 3, the tubular body of the indicator contains visual markings reflecting the relative condition of the clutch linings, ranging from "New" to "Worn".

Another principal feature of the present invention relates to providing an angular flexibility of the constant running bearing member 58 with respect to the axis "a—a" (FIG. 1) of input shaft rotation for accomodation of axial misalignments. Referring back to FIG. 2, the radially disposed wave washer 110 is interposed between the outer race 64 and annular flange 68 to permit satisfactory absorption of loads transmitted to the thrust ring 42 and ultimately to the carrier 56. Without such flexibility, the bearing carrier 56 can be excessively rocked relative to the tubular support member 48, resulting in binding of the carrier on the support member. Moreover, when such rocking action is excessive, the seal integrity of hydraulic fluid system may be broken resulting in system leakage and consequent failure. In the preferred form, the wave washer 110 is designed to permit a range of 5–10 degrees of angular flexibility with respect to the axis "a—a".

A conventional Zerk fitting 112 communicates with a lubricant duct 114 to provide lubricant into the member 58.

Figure 4:
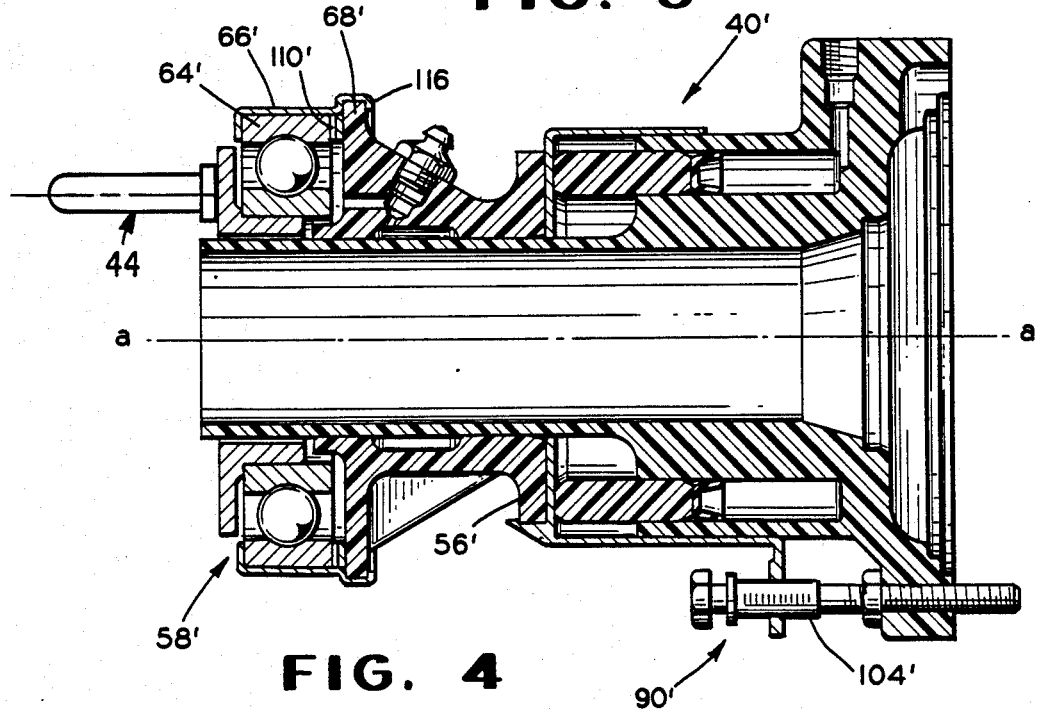
FIG. 4 is an enlarged sectional view of an alternate preferred embodiment of the release bearing assembly of the present invention.

An alternate embodiment of a release bearing assembly constructed in accordance with the present invention is depicted in FIG. 4. The alternate release bearing assembly 40' is in all respects similar to the embodiment of FIG. 2 except in the case of the resilient snap-fittable bearing housing 66 which was utilized in the embodiment of FIG. 2. Instead of the resilient bearing housing 66, a crimped steel preload ring 66' is utilized to secure the bearing outer race 64' against the annular flange 68' of the bearing carrier 56'. As in the FIG. 2 embodiment, the wave washer 110' provides angular flexibility of the bearing member 58' for accomodating misalignments with respect to the axis "a'–a'". Also as in the FIG. 2 embodiment, a stop system 90' is employed along with a visual wear indicator 104'The preload ring 66' includes a retainer ring 116 which must be formed during assembly to preload the wave washer 110'. Hence the ring 66' does not provide the inherent preload feature of the resilient housing 66 which preloads the washer 110 by means of the aforenoted flange-detent connection system upon the mere assembly of the carrier parts.

Although only two preferred embodiments have been detailed and discussed herein, the appended claims are envisioned to cover embodiments not specifically presented.

What is claimed is:

1. In a friction clutch system including a fixed tubular support, a bearing carrier defining an axis and being axially moveable along said support, a constant running clutch release bearing member fixed to one end of said carrier, said bearing member defining inner and outer races; an improvement comprising said carrier comprising two parts, said first part defining a radially extending flange, said second part defining an annular housing containing a detent mateable with said flange, whereby said parts are coupled together via a snap-fittable flange-detent connection system, and means for permitting relative movement of said bearing member angularly with respect to said axis, said means defining a radially disposed wave washer interposed between said flange and said outer race, wherein said wave washer is preloaded against said bearing member by said connection system, said friction clutch system further comprising a thrust ring disposed for contacting a plurality of clutch levers, said thrust ring rigidly secured to said inner race of said bearing member, wherein said thrust ring further comprises a driver member extending from said thrust ring for interdigital communication with said levers, wherein said means for permitting angular movement of said bearing member relative to said axis permits 5–10 degrees of movement with respect to said axis, said friction clutch system further comprising means for providing a limit in axial travel of said bearing member in a direction of said clutch disengagement, said means for providing a limit in axial travel of said bearing member including an elongated shaft threaded at a first end, said first end fixed to said tubular support and having a radially extending member constrained against movement in said direction of clutch disengagement, said radially extending member slidably positioned on an opposed unthreaded second end, a radially projecting flange fixed to said carrier, said flange containing an opening through which said shaft extends, whereby said radially extending member is disposed for arresting movement of said flange for limiting said axial travel of said bearing member.

2. In a friction clutch including a tubular support fixed at one end, a bearing carrier defining an axis and being axially movable along said support, a constant running clutch release bearing member fixed to one end of said carrier and spaced from said fixed end of said support; an improvement comprising means for providing a limit in axial travel of said bearing member in a direction away from said end of said fixed support, said means comprising an elongated shaft threaded at one end and fixed to said tubular support and having a radially projecting structure fixed to an opposing unthreaded end, a sleeve positioned over said shaft, said sleeve including a radially extending member and being axially slidable over said shaft, a radially projecting flange fixed to said carrier, said flange containing an opening through which said shaft and sleeve extend, whereby said radially projecting structure is disposed for making abutting contact with said flange through said radially extending member to limit said axial travel at a predetermined limit of clutch stroke, and wherein said radially extending member of said sleeve is disposed for making abutting contact with said radially projecting flange of said carrier, said sleeve further comprising visually identifiable markings thereon to indicate amount of clutch wear.

3. The friction clutch of claim 2 wherein said bearing member comprises inner and outer races, said carrier comprises a release bearing flange, said friction clutch system further comprising means for permitting angular movement of said bearing member relative to said axis, said means defining a radially disposed wave washer interposed between said release bearing flange and said outer race.

4. The friction clutch of claim 3 wherein said carrier comprises two parts, said first part defining said radially extending flange, said second part defining an annular housing containing a detent mateable with said release bearing flange, whereby a snap-fit flange-detent connection system is provided.

5. The friction clutch of claim 4 wherein both said carrier parts comprise a resilient, non-metallic material.

6. The friction clutch of claim 5 wherein said material is polytetrafluoroethylene.

7. The friction clutch of claim 3 wherein said carrier further comprises a crimped metal preload ring positioned against said release bearing flange to retain said bearing member thereagainst.

8. The friction clutch of claim 4 wherein said mateable snap-fit flange-detent system preloads said wave washer upon assembly of said carrier parts.

* * * * *